Sept. 28, 1943.                H. ZIEBOLZ                 2,330,654
                         FLUID IMPULSE CONTROLLER
                         Filed Aug. 29, 1940           2 Sheets-Sheet 1
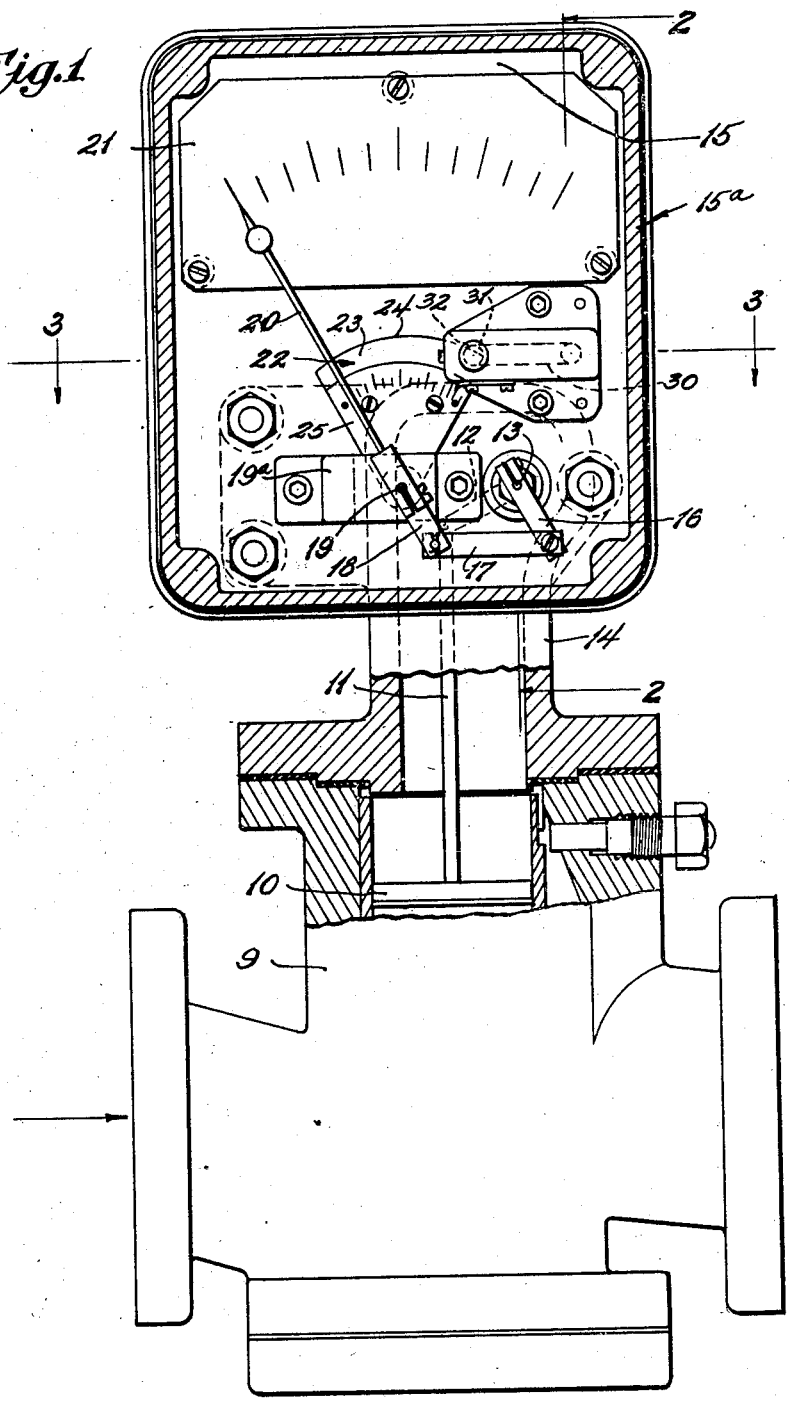
Inventor
H. Ziebolz
By A. D. Adams
Attorney Sept. 28, 1943.   H. ZIEBOLZ   2,330,654
FLUID IMPULSE CONTROLLER
Filed Aug. 29, 1940   2 Sheets—Sheet 2
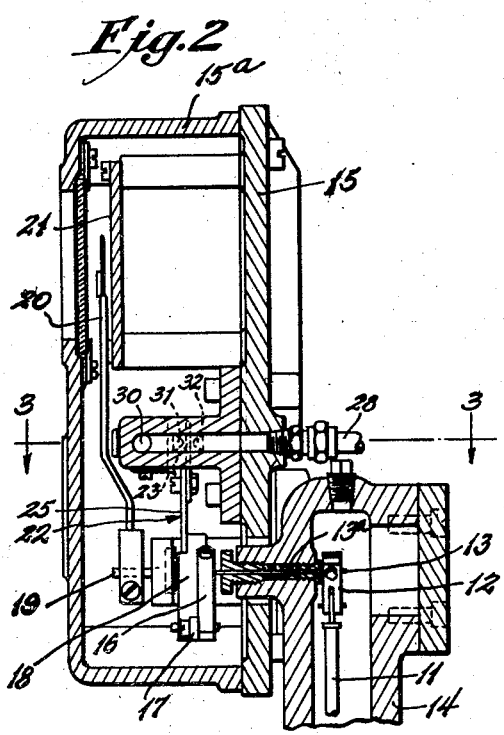
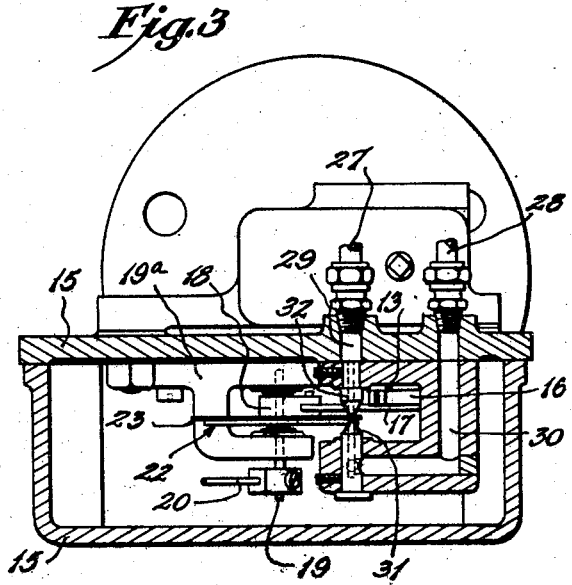
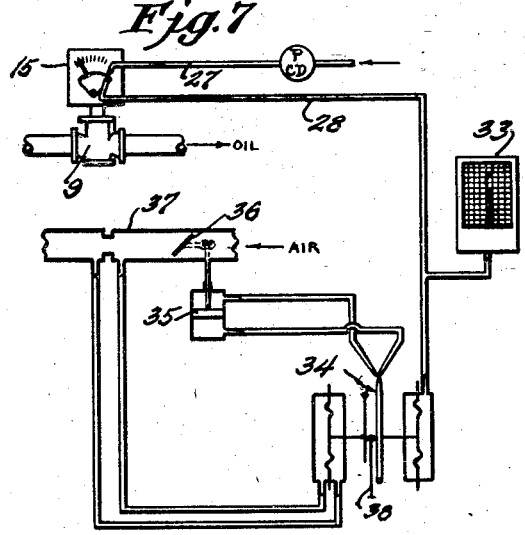
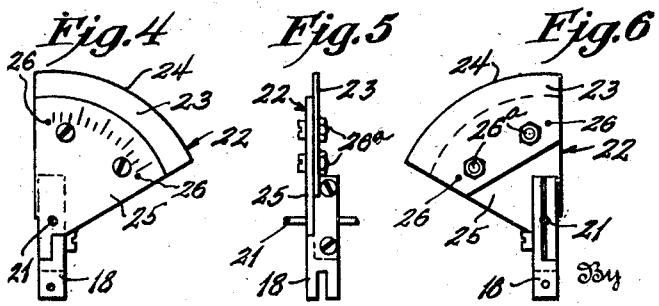
Inventor
H. Ziebolz
By A. D. Adams
Attorney

UNITED STATES PATENT OFFICE 2,330,654

FLUID IMPULSE CONTROLLER

Herbert Ziebolz, Chicago, Ill., assignor to Askania Regulator Company, Chicago, Ill., a corporation of Illinois Application August 29, 1940, Serial No. 354,765

3 Claims. (Cl. 137—111)

The present invention relates to a device for producing and controlling fluid impulses which may be utilized to operate indicators or flow control apparatus in response to fluid flows.

More particularly the invention relates to a device operable to produce a controlled impulse which is proportional to the rate of flow of a fuel oil or gas. This impulse may be utilized to operate an indicator or a controller for controlling the flow of air to support combustion of the oil or gas.

Other objects will be apparent from the following description when considered in connection with the accompanying drawings, which:

Fig. 1 is a side elevation partly in section;

Fig. 2 is a sectional view of the flow indicator and air impulse pressure control taken on line 2—2 of Fig. 1;

Fig. 3 is a sectional view taken on line 3—3 of Fig. 2;

Figs. 4 to 6 are side elevations illustrating the control cam; and

Fig. 7 is a diagrammatic view of the system.

Referring to Fig. 1, a flow meter 9, of any desired construction, as for instance shown in Patent No. 2,052,022, issued August 25, 1936, is provided with a floating piston 10 having a coaxial stem 11. This stem is pivotally connected to an arm 12, Fig. 2, which, in turn, is secured to one end of a rotatably mounted shaft 13 passing through a stuffing box 13a in a casing 14 which is mounted on the flow meter 9. The shaft is adapted to operate controlling and indicating mechanism mounted on a vertical plate 15 removably secured to the casing 14. The mechanism is enclosed within a housing 15a which is removably secured to the plate 15 to provide accessibility to the mechanism when adjustment or removal are necessary. The shaft 13 extends through the plate 15 into the housing 15a and a crank arm 16 is secured on the projecting end thereof. A link or connecting rod 17 is pivotally connected at one end to the crank arm 16 and at the other end to an arm 18 secured on a stub shaft 19 journalled in a U-shaped bearing support 19a carried by the plate 15. The shaft has a pointer 20 cooperating with a dial 21 to indicate changes in pressure drop or flow rate in the flow meter 9.

The arm 18 carries a cam 22 the periphery of which cooperates with delivery and receiving nozzles through which air under pressure flows as will be explained.

The construction of the cam 22 is shown in Figs. 4 to 6 in which a cam plate or vane 23 provided with a slightly spiral peripheral edge 24 is located and secured to a base plate 25 by suitable means such as dowel pins 26 and bolts or screws 26a. The plate 25 is suitably secured to the arm 18. The structure permits the removal of the indicator 20 and pressure vane 23 which makes it possible to calibrate the cam 22 independently of the meter. This feature simplifies production and service. To change the cam, it is only necessary to take off the housing 15a. Then, the indicator and the vane can be changed and adjusted to obtain the desired pressure. The cam plate or vane 23 can be removed and replaced without changing any of the other adjustments. Since the vane 23 is secured by bolts and dowel pins, it will always be possible to replace it into exactly the same position.

It is obvious that upon any vertical movement of the piston 10 and its stem 11 a simultaneous and equal rotary movement of the pointer 20 and vane 23 will result through the intermediary of the shaft 13, arm 16, link 17, arm 18 and stub shaft 19.

Conduits or pipes 27 and 28 are connected to the plate 15 and communicate through passages 29 and 30 to two axially opposed nozzles or orifices 31 and 32. Air under constant pressure is delivered through the pipe 27 and conduit 29 to the nozzle 32 and flows out of the latter to the nozzle 31 and conduit 30 and pipe 28 in dependence upon the position of the vane 23. A movement of the piston 10, upon a change in the fluid flow in meter 9 will move the vane 23 to further open or close the supply and the receiving nozzles 32 and 31 due to the spiral periphery 24 of the cam plate 23 whereby the pressure of the air in the conduits 30 and 28 becomes a function of the fluid flow. There is a substantially constant airflow at a constant pressure through conduits 27 and 29 and nozzle 32. The air in nozzle 31 and conduits 27 and 29 does not flow (after a sufficient volume has entered the nozzle to change the pressure), since these conduits lead into the deadened chamber of a measuring system. The pressure in nozzle 31 and conduits 28 and 30 depends on the impact of the air hitting the receiving nozzle 31 which is more or less shielded by the vane 24. Therefore, depending upon the relative position of the cam plate and its shape, a definite pressure will correspond to each cam position. As a matter of fact, for ratio controls the shape of the periphery 24 should be parabolic, spiral, or of such shape or configuration that the pressure obtained is proportional to the square of the flow. The peripheral edge configuration is dependent on the size of the nozzles, the shape of the latter, the distance between the nozzles, etc., and finally on the flow-stroke characteristic of the flow meter.

The pressure in the conduit 28 may be in communication with a recording device 33, Fig. 7, and a jet pipe relay 34 of the well known "Askania" jet pipe type. The relay 34 is connected to a fluid controlled piston 35 which, in turn, is connected to and controls a butterfly valve 36 to control the air flow in the manifold 37. The relay 34 is provided with a well known ratio slider 38.

It is believed that the operation of the apparatus and the system is obvious from the foregoing description. Any change in the oil flow in meter 9 results in an adjustment of the vane 23 to increase or decrease the area of that part of the vane which projects into the path of the air flow across the space between the nozzle 32 and the inlet opening in nozzle 31, the vane thus causing an increase or decrease in pressure in the conduit 28. As the pressure in conduit 28 increases or decreases, a corresponding movement of jet pipe 34 will move the piston 35 to adjust the position of the valve 36, the piston 35 remaining in any adjusted position as long as the jet pipe 34 is centrally positioned relative to the inlet and outlet pipes, as is well known. It is thus possible to maintain a proportional ratio between the oil and air flows as the oil flow changes so that the proper amount of air flow is constantly and instantly adjusted not only by actual control but by graphic indication. The apparatus therefore indicates and controls fluid flows by a variable orifice meter of which the position of orifice is transmitted to a cam which controls a fluid pressure in such a way that a desired relation is established between the fluid pressure and the fluid flow to be metered. This secondary fluid pressure is utilized in a ratio control device to balance the air flow impulse or pressure to maintain a desired ratio.

It is of course obvious that this invention is not restricted to the exact embodiments and apparatus shown and described and it is not necessary that all elements shall be used conjointly, but may be used in any combination and sub-combination.

What is claimed is:

1. A device of the character described comprising a rotatably mounted vane having a spiral peripheral edge; and means including a delivery nozzle spaced from one side of the vane adjacent to its peripheral edge for directing fluid under pressure higher than atmospheric pressure across the edge of the vane and a receiving orifice for the fluid on the opposite side of and spaced from the peripheral edge of the vane, whereby said peripheral edge varies the pressure of the fluid in the receiving orifice.

2. A device according to claim 1, in which a housing is provided for the vane and the fluid pressure means, said vane being detachable from its mounting in the housing.

3. A device according to claim 1 wherein the vane is removably mounted on a plate so that it may be replaced by a vane having a different curvature.

HERBERT ZIEBOLZ.